May 13, 1930. F. J. BULLOCK 1,758,557
FEEDING DEVICE FOR ENSILAGE CUTTERS AND THE LIKE
Filed Sept. 26, 1927 2 Sheets-Sheet 1
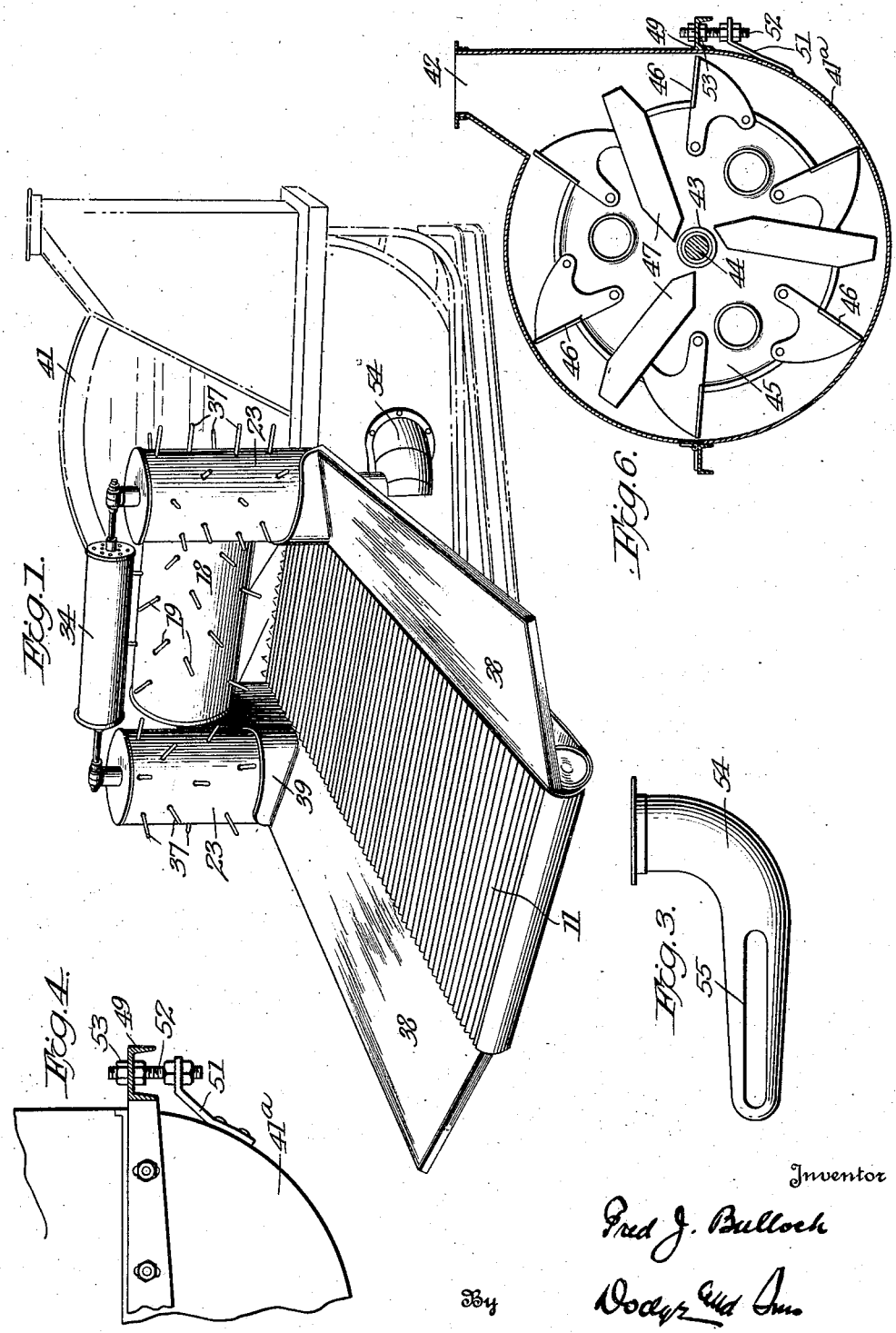
Inventor
Fred J. Bullock
By Dodge and Sons
Attorneys May 13, 1930. F. J. BULLOCK 1,758,557
FEEDING DEVICE FOR ENSILAGE CUTTERS AND THE LIKE
Filed Sept. 26, 1927  2 Sheets-Sheet 2
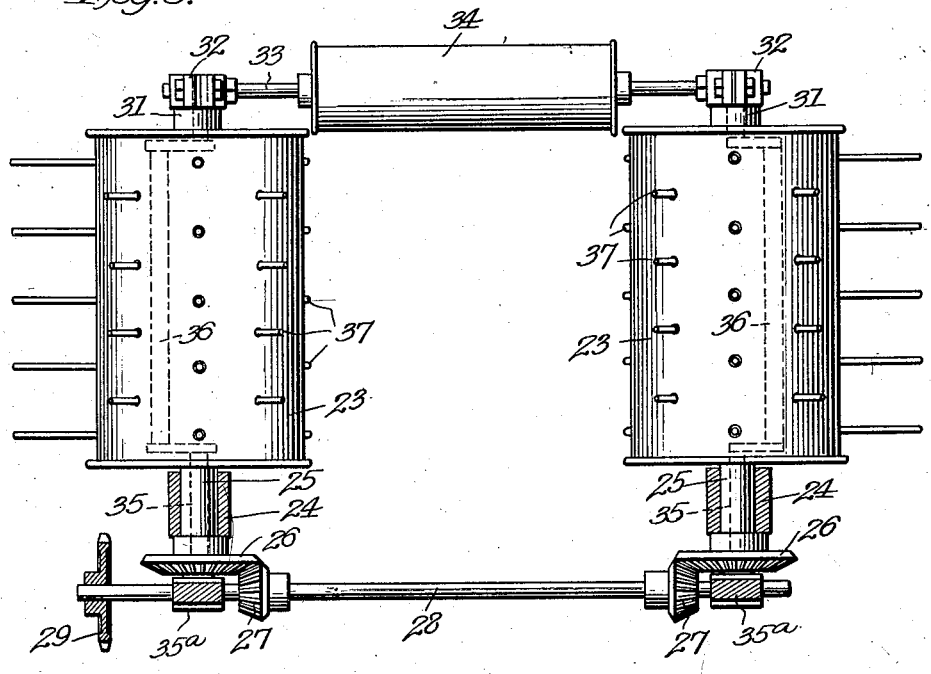
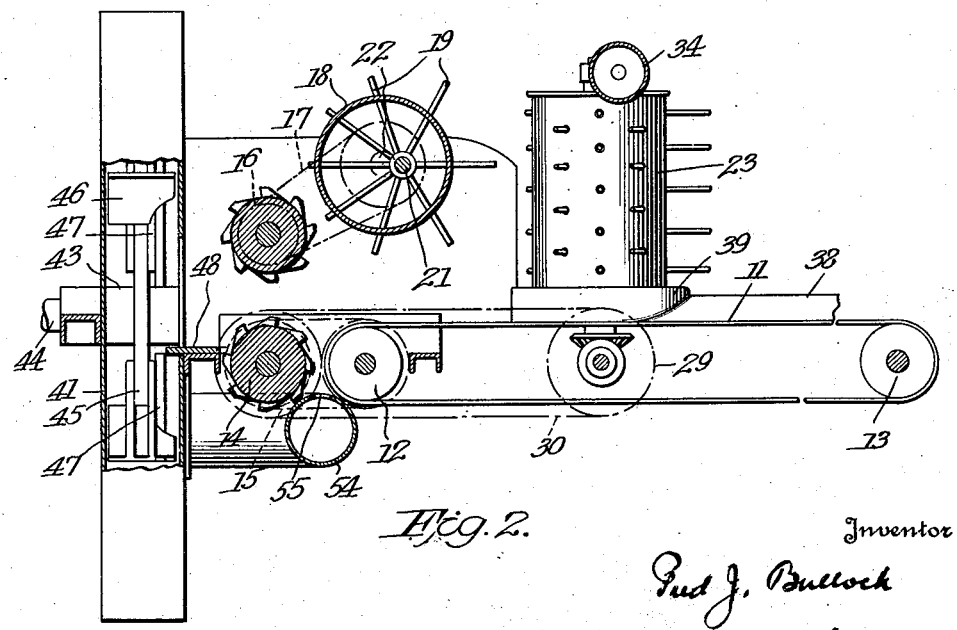

Patented May 13, 1930

1,758,557

UNITED STATES PATENT OFFICE

FRED J. BULLOCK, OF SHORTSVILLE, NEW YORK, ASSIGNOR TO PAPEC MACHINE COMPANY, OF SHORTSVILLE, NEW YORK, A CORPORATION OF NEW YORK

FEEDING DEVICE FOR ENSILAGE CUTTERS AND THE LIKE

Application filed September 26, 1927. Serial No. 222,135.

This invention relates to feeding devices for ensilage cutters and the like, applicable to specifically different types of cutter. It is designed to feed to the cutter certainly and rapidly, stringy materials such as hay, alfalfa, pea vines, and the like, and to recover and feed to the blower, leaves and small stems which are apt to be severed from the larger stems or stalks. This portion of the crop treated is ordinarily lost unless special means such as those contemplated by the present invention are provided to feed such small severed parts to the blower which customarily forms part of the cutter.

Generally stated, an ensilage cutter includes a fan housing, a combined fan and rotary cutter mounted to rotate in said housing, fixed knives with which the rotary cutters co-act, and some means for feeding the material to the cutter. The material is thus cut as it enters the housing, and is discharged through a tangential spout from the housing by the blower action.

In a prior patent of Bullock and Billings, No. 1,168,932 dated January 18, 1916, there is described a feeding mechanism which includes a horizontal roll having fingers or prongs slidable through its periphery and connected at their inner ends to an axis displaced from the axis of the feed roll in such manner that the fingers protrude on the outer or entrance side of the roll, and are progressively retracted as they swing with the roll to the inner or discharge side thereof. The fingers thus engage the material being fed and draw it beneath the roll, freeing the same at the point of entrance into the cutter and avoiding any tendency to wind the fed material around the feed roll.

The present invention contemplates the addition to a device of the character just described, of two similar vertical rolls, so that the material to be fed is compressed from both sides and from the top and held in feeding contact with the apron upon which it rests. In this way the feed is rendered much more positive.

Another fetaure of the present invention is a suction device combined with the fan. Any feed device for an ensilage cutter involves some sort of feed table, and commonly, some conveying device associated therewith. In the device illustrated this consists of a travelling feeding apron which carries the material to and beneath the horizontal feed roll. In such devices there is commonly a short interval between the feed table and the main feed roll, or between the feed table and the entrance to the cutter, and at this point leaves and short pieces are apt to drop away from the feed and be lost. They are recovered by a suction nozzle which is positioned to receive them, and which is connected to the air supply or suction of the fan. In prior devices the housing was formed with one or more openings to supply air to the fan, while, in the present invention a single air feed opening is used to which the air suction nozzle just described is connected. Thus leaves and other pieces too small to require chopping are fed directly into the fan and passed through the discharge without the necessity of passing through the cutter at all.

The preferred embodiment of the invention is illustrated in the accompanying drawings, in which:

Figure 1 is a perspective view of a cutter with my improved feeding mechanism applied;

Fig. 2 is a longitudinal section through the feed apron showing the relation of the various rolls to the fan and cutter, and showing also how the vertical rolls characteristic of the present invention are driven;

Fig. 3 is a plan view of the nozzle;

Fig. 4 is a fragmentary view of a portion of the fan and cutter housing, showing how the lower half is adjustably mounted in position;

Fig. 5 is an elevation showing the vertical feed rolls and their driving connections;

Fig. 6 is a diagrammatic section of a combined fan and cutter with its housing.

In the above figures, details of the cutter mechanism and of the drive to such parts of the feed mechanism as are common in the art are omitted to simplify the drawings.

Referring particularly to Figs. 1 and 2, the feed apron, which is of ordinary construction, is illustrated at 11. This is supported on the usual rollers 12 and 13, the roll 12 being driven by the lower main feed roll 14 through a sprocket chain 15. The upper main feed roll 16 is connected by a sprocket chain 17 with a horizontal auxiliary feed roll 18. This conforms in its general construction to that shown in the Bullock and Billings Patent No. 1,168,932 above identified, being provided with a series of fingers 19 which are longitudinally slidable through openings in the periphery of said roll and which are connected to an axis 21 offset from the axis 22 of roll 18. The axis is offset toward the entrance end of the machine, so that the fingers are retracted to the maximum extent as they approach the main upper feed roll 16. The main feed rolls 14 and 16 are driven by any suitable means, but this is not illustrated as such driving mechanism may assume various forms and the particular form thereof is not material to the present invention.

Mounted in upright positions at opposite sides of the apron 11 are two auxiliary feed rolls 23, approximately tangent to the opposite edges of said apron. These rolls are supported at their lower ends in bearings 24 fixed on the frame of the machine, and in these bearings there turn trunnions 25 fixed to the rolls 23. Fast on the lower ends of the trunnions are bevel gears 26 which are driven by reversely arranged pinions 27 on a cross shaft 28. This shaft carries a sprocket 29 which is driven by a sprocket chain 30 (see Fig. 2) from a companion sprocket fast to roll 14. The reverse arrangement of the pinions 27 ensures rotation of the rolls 23 in reverse angular directions. At the upper ends of the rolls 23 are trunnions 31 which are swiveled in bearings 32 connected by a tie-rod 33. On this tie-rod there is mounted for free rotation a roller 34. This roller serves to hold down and to guide into the space above apron 11 and between the rolls 23, the material fed to the cutter, thus encuring its proper delivery to and through the feed opening of the casing of the combined fan and cutter wheel. The tie-rod 33 supports the rolls 23 against the outward thrust of the material being fed between the rolls. Swiveled in the trunnions 25 and 31 of each of the rolls 23 is a shaft 35 having an offset portion 36 on which are swiveled the inner ends of the fingers or prongs 37. Shafts 35 are held against rotation by lugs 35$^a$ formed on their lower ends, and provided with bearings in which shaft 28 rotates. The offsets are so arranged that the ends of the fingers are retracted as they approach the horizontal feed roll 18. They thus have their maximum protrusion on the entering side relatively to apron 11, and act to crowd the material treated toward the center of the apron so that it will enter between the vertical rolls 23 and be caught by the fingers on the horizontal roll 18. These fingers also hold the material down on the apron so that it will readily pass between the same and the roller 18 and enter smoothly between the rolls 14 and 16.

At each side of the apron 11 there are inclined confining boards 38 which terminate in arcuate guards 39 surrounding the lower portions of the vertical rolls 23. These prevent the material from passing beneath the apron 11, and assist in directing it into the main feed rolls 14 and 16.

The housing for the cutter and fan structure is mounted just beyond the main feed rolls 14 and 16, being indicated at 41, and is of the familiar snail shell type having a tangential discharge passage 42. The fan consists of a hub 43 mounted on a drive shaft 44 whose axis is parallel with the longitudinal center line of the feed apron 11 and slightly above the working run thereof. Mounted on the hub 43 is a disk-like spider 45 on the periphery of which are mounted a plurality of radial fans or fan blades 46. These operate as the ordinary centrifugal fan in the housing 41, the discharge passing out through the tangential opening 42. The cutter blades, preferably three in number, are shown at 47, and their cutting edges are secant to their circular path, thus producing a shearing cut in a familiar manner, with a fixed blade indicated at 48 (Fig. 2).

The construction of the fan and blades so far described is not a feature of the present invention, and may assume various different forms. The fan housing 41 is preferably made in two parts, divided horizontally on the axis of shaft 44, and the lower half is made adjustable to afford proper clearance for the fan blades 46. The mode of adjustment is illustrated in Fig. 4 in which 49 indicates a portion of the framework of the machine, and the lower or adjustable portion of the housing is indicated at 41$^a$. This portion 41$^a$ of the housing carries a bracket 51 connected to frame member 49 by a stud 52 having four nuts 53, one above and one below the frame member 49, and one above and one below bracket 51, and affords a convenient mode of adjusting the height of section 41$^a$.

The fan housing 41, 41$^a$, is air-tight, the usual central air inlet port being omitted, and the air entering through a duct 54 (see Figs. 1 and 3). This duct extends beneath the interval between roll 12 which carries the discharge end of apron 11 and the main feed roll 14. Loose material such as leaves and short stems falling at this point will be drawn by the air suction into the elongated slot 55 provided for this purpose. The slot 55 is the sole port for air admission to the fan and the duct 54 enters the housing 41 as near the center thereof as is conveniently possible, and at any rate within the circular path of the fan blades 46. In this way a pronounced suction is produced through the duct 54 and slot 55, and by the normal action of the fan forming a part of an ordinary ensilage cutter. Thus the suction inherently present in such devices is usefully applied to salvage small parts of the fodder which would otherwise not enter the machine, and which being small need not pass through the cutter.

The important features of the invention therefore are: The combination with a known feeding mechanism of the vertical, fingered rolls operating to compress the material laterally and ensure a positive and rapid feed to the main feed rolls of the device; and further, the combination with a conventional feeding device of an air suction device operated by the fan forming a part of an ordinary ensilage cutter, said suction device serving to salvage small particles which would otherwise escape from the machine.

The exact form of the ensilage cutter is not material, nor is the invention limited to any particular mode of driving the feed from the cutter and blower mechanism, it being well understood in the art that the entire machine is customarily driven from a single source of power.

In addition to the suggested possibilities of variation in the structure, others will readily suggest themselves to those skilled in the art, and no limitation to the specific construction illustrated is implied except as set out in the claims.

In the drawing I have shown the rolls 23 arranged to rotate about vertical axes and this is the preferred construction. However, true vertical position of the axes is not essential, and reasonable departure therefrom is permissible and is to be understood as comprehended by the claims.

What is claimed is:—

1. In a feeding device for ensilage cutters and the like, the combination of a traveling feed apron; a pair of power driven feed rollers mounted on substantially vertical axes at opposite sides of said apron; fingers mounted to be projected through the peripheries of said rollers; and means operable by the rotation of said rollers to project and retract said fingers as the rollers rotate, the fingers serving to force the material to be fed toward the center of the apron and between the rollers.

2. In a feeding device for ensilage cutters and the like, the combination of a traveling feed apron; a feed roller mounted on a horizontal axis above said apron; a pair of feed rollers mounted on vertical axes at opposite sides of said apron; fingers mounted to be projected through the peripheries of all three rollers; and means operable by the rotation of said rollers to project and retract said fingers as the rollers rotate, said fingers serving to force the fed material toward the middle of the apron and to compress it against said apron.

3. In a feeding device for ensilage cutters and the like, the combination of a traveling feed apron; a feed roller mounted on a horizontal axis above said apron; a pair of feed rollers mounted on vertical axes at opposite sides of said apron and in advance of the first-named roller; fingers mounted to be projected through the peripheries of all three rollers; and means operable by the rotation of said rollers to project and retract said fingers as the rollers rotate, said fingers serving to force the fed material toward the middle of the apron and then to compress it against said apron.

4. In a feeding device for ensilage cutters and the like, the combination of a support for guiding the material to the cutter; a pair of power driven feed rolls mounted on substantially vertical axes at opposite sides of said support; fingers mounted to be projected through the peripheries of said rolls; and means operable by the rotation of said rolls to project and retract said fingers as the rolls rotate, the fingers serving to force the material to be fed toward the center of the support and between the rolls toward the cutter.

5. In a feeding device for ensilage cutters and the like, the combination of a support for guiding material to the cutter; a feed roller mounted on a horizontal axis above said support; a pair of feed rollers mounted on vertical axes at opposite sides of said supports; fingers mounted to be projected through the peripheries of all three rollers; means operable by the rotation of said rollers to project and retract said fingers as the rollers rotate, said fingers serving to draw material between and through the rollers; and means for driving said rollers in unison.

In testimony whereof I have signed my name to this specification.

FRED J. BULLOCK.